United States Patent
Sakurada et al.

(10) Patent No.: US 9,773,592 B2
(45) Date of Patent: *Sep. 26, 2017

(54) PERMANENT MAGNET, AND MOTOR AND GENERATOR USING THE SAME

(71) Applicant: KABUSHIKI KAISHA TOSHIBA, Minato-ku, Tokyo (JP)

(72) Inventors: Shinya Sakurada, Tokyo (JP); Yosuke Horiuchi, Tokyo (JP); Keiko Okamoto, Kanagawa (JP); Masaya Hagiwara, Kanagawa (JP); Tsuyoshi Kobayashi, Kanagawa (JP); Masaki Endo, Tokyo (JP); Tadahiko Kobayashi, Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/661,300

(22) Filed: Mar. 18, 2015

(65) Prior Publication Data

US 2015/0221422 A1 Aug. 6, 2015

Related U.S. Application Data

(63) Continuation of application No. PCT/JP2013/005448, filed on Sep. 13, 2013.

(51) Int. Cl.
*H01F 1/053* (2006.01)
*H01F 1/055* (2006.01)
(Continued)

(52) U.S. Cl.
CPC .............. *H01F 1/055* (2013.01); *C22C 1/00* (2013.01); *C22C 1/0441* (2013.01);
(Continued)

(58) Field of Classification Search
None
See application file for complete search history.

(56) References Cited

U.S. PATENT DOCUMENTS

2011/0278976 A1\* 11/2011 Horiuchi ................. C22C 19/07
310/152
2012/0074804 A1 3/2012 Horiuchi et al.
(Continued)

FOREIGN PATENT DOCUMENTS

JP 01-184244 7/1989
JP 2012-069750 4/2012
(Continued)

OTHER PUBLICATIONS

Huang et al. (J of Applied Physics, 1994, vol. 75, p. 6280-6282).\*
(Continued)

*Primary Examiner* — Xiaowei Su
(74) *Attorney, Agent, or Firm* — Amin, Turocy & Watson LLP

(57) ABSTRACT

A permanent magnet of an embodiment includes: a composition represented by a composition formula: $R(Fe_pM_qCu_rCo_{1-p-q-r})_z$, where R is at least one element selected from rare-earth elements, M is at least one element selected from Zr, Ti, and Hf, and relations of $0.3 \leq p \leq 0.4$, $0.01 \leq q \leq 0.05$, $0.01 \leq r \leq 0.1$, and $7 \leq z \leq 8.5$ (atomic ratio) are satisfied; and a structure including a cell phase having a $Th_2Zn_{17}$ crystal phase, and a cell wall phase existing to surround the cell phase. An average magnetization of the cell wall phase is 0.2 T or less.

11 Claims, 3 Drawing Sheets

(51) Int. Cl.
   C22C 1/00    (2006.01)
   H01F 1/08    (2006.01)
   C22C 19/07   (2006.01)
   C22C 30/02   (2006.01)
   H02K 1/02    (2006.01)
   C22C 1/04    (2006.01)
   H01F 1/059   (2006.01)

(52) U.S. Cl.
   CPC ............ *C22C 1/0491* (2013.01); *C22C 19/07* (2013.01); *C22C 30/02* (2013.01); *H01F 1/0557* (2013.01); *H01F 1/086* (2013.01); *H02K 1/02* (2013.01); *B22F 2998/10* (2013.01); *B22F 2999/00* (2013.01); *H01F 1/0596* (2013.01)

(56) References Cited

U.S. PATENT DOCUMENTS

| | | |
|---|---|---|
| 2012/0146444 A1 | 6/2012 | Horiuchi et al. |
| 2013/0076184 A1 | 3/2013 | Horiuchi |
| 2013/0241682 A1* | 9/2013 | Horiuchi ............... H01F 1/0557 335/302 |
| 2014/0139064 A1* | 5/2014 | Horiuchi ................. H01F 1/01 310/156.01 |
| 2015/0270040 A1* | 9/2015 | Horiuchi ................ C22C 19/07 310/152 |

FOREIGN PATENT DOCUMENTS

| | | |
|---|---|---|
| JP | 2013-72097 | 4/2013 |
| WO | 2011016089 | 2/2011 |

OTHER PUBLICATIONS

Liu, IEEE Transactions on Magnetics, 1989, vol. 25, p. 3785-3787.*
Japanese Office Action for Japanese Patent Application No. 2015-505362 mailed on Mar. 15, 2016.
International Preliminary Report on Patentability for PCT Application No. PCT/JP2013/005448 mailed on Mar. 24, 2016.
Chinese Office Action for Chinese Patent Application No. 201380045802.8 mailed on Oct. 17, 2016.
Japanese Office Action for Japanese Patent Application No. 2015-505362 mailed on Jul. 5, 2016.

* cited by examiner

PERMANENT MAGNET, AND MOTOR AND GENERATOR USING THE SAME

CROSS-REFERENCE TO RELATED APPLICATIONS

This application is a continuation of prior International Application No. PCT/JP2013/005448 filed on Sep. 13, 2013; the entire contents of all of which are incorporated herein by reference.

FIELD

Embodiments disclosed herein generally relate to a permanent magnet, and a motor and a generator using the same.

BACKGROUND

As a high-performance permanent magnet, there have been known rare-earth magnets such as a Sm—Co based magnet and a Nd—Fe—B based magnet. When a permanent magnet is used for a motor of a hybrid electric vehicle (BEV) or an electric vehicle (EV), the permanent magnet is required to have heat resistance. In a motor for HEV or EV, a permanent magnet whose heat resistance is increased by replacing a part of neodymium (Nd) of Nd—Fe—B based magnet with dysprosium (Dy) is used. Dy is one of rare elements, and thus a permanent magnet not using Dy is demanded. The Sm—Co based magnet has a high Curie temperature, and thus is known to exhibit excellent heat resistance as a magnet having a compositional system not using Dy.

In a motor or the like using the Sm—Co based magnet, the magnet is expected to realize favorable operating characteristics at a high temperature. However, a magnetization of the Sm—Co based magnet is lower than that of the Nd—Fe—B based magnet, and a sufficient value of maximum energy product $((BH)_{max})$ is not realized. In order to increase the magnetization of the Sm—Co based magnet, it is effective to replace a part of Co with Fe, and to increase an Fe concentration. However, a coercive force of the Sm—Co based magnet tends to decrease in a composition region having a high Fe concentration, and in addition to that, a squareness of hysteresis loop also tends to deteriorate. Accordingly, there has been demanded a technique of enhancing the coercive force and a squareness ratio of the Sm—Co based magnet having the high Fe concentration, while maintaining a high magnetization in the magnet.

DETAILED DESCRIPTION

Figure 1:
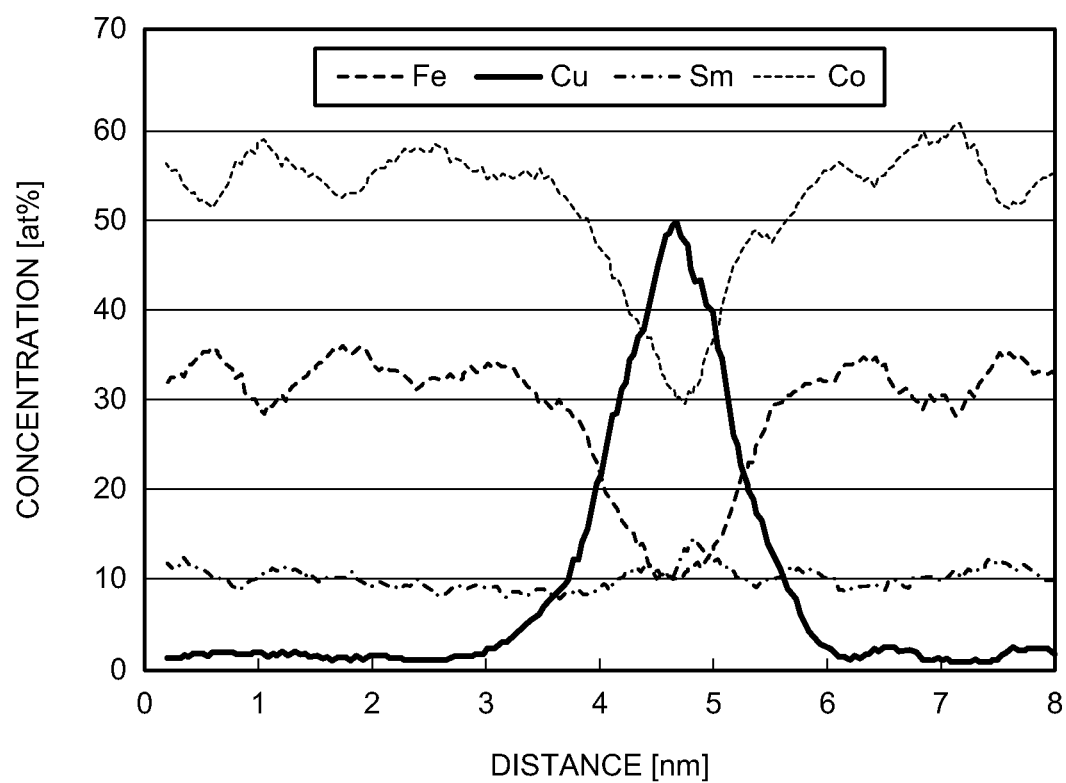
FIG. 1 is a diagram illustrating one example of atomic concentration distribution in the vicinity of a cell wall phase in a permanent magnet of an embodiment.

A permanent magnet of an embodiment includes: a composition represented by a composition formula: $R(Fe_pM_qCu_rCo_{1-p-q-r})_z$, where R is at least one element selected from the group consisting of rare-earth elements, M is at least one element selected from the group consisting of Zr, Ti, and Hf, p is a number satisfying $0.3 \leq p \leq 0.4$ (atomic ratio), q is a number satisfying $0.01 \leq q \leq 0.05$ (atomic ratio), r is a number satisfying $0.01 \leq r \leq 0.1$ (atomic ratio), and z is a number satisfying $7 \leq z \leq 8.5$ (atomic ratio); and a structure including a cell phase and a cell wall phase. The cell phase has a $Th_2Zn_{17}$ crystal phase. The cell wall phase exists to surround the cell phase. In the above-described permanent magnet, an average magnetization of the cell wall phase is 0.2 T or less.

Hereinafter, a permanent magnet of an embodiment will be described in detail. The permanent magnet of the embodiment has a composition represented by a composition formula:

$$R(Fe_pM_qCu_rCo_{1-p-q-r})_z \qquad (1)$$

R is at least one element selected from the group consisting of rare-earth elements. M is at least one element selected from the group consisting of Zr, Ti, and Hf. p is a number satisfying $0.3 \leq p \leq 0.4$ (atomic ratio). q is a number satisfying $0.01 \leq q \leq 0.05$ (atomic ratio). r is a number satisfying $0.01 \leq r \leq 0.1$ (atomic ratio). z is a number satisfying $7 \leq z \leq 8.5$ (atomic ratio).

In the composition formula (1), as the element R, at least one element selected from rare-earth elements including yttrium (Y) is used. Any of the elements R brings about great magnetic anisotropy and gives a high coercive force to the permanent magnet. As the element R, at least one element selected from samarium (Sm), cerium (Ce), neodymium (Nd), and praseodymium (Pr) is preferably used, and the use of Sm is especially desirable. When 50 atomic % or more of the element R is set to Sm, it is possible to enhance the coercive force and the like of the permanent magnet with good reproducibility. Further, 70 atomic % or more of the element R is desirably Sm.

The element R is contained so that an atomic ratio of the element R and elements (Fe, M, Cu, Co) other than the element R falls within a range of 1:7 to 1:8.5, namely, the z value falls within a range of 7 to 8.5. If a ratio of the elements other than the element R to the element R is less than 7 (if the z value is less than 7), a saturation magnetization is significantly lowered. If the ratio of the elements other than the element R to the element R exceeds 8.5 (if the z value exceeds 8.5), a precipitation of a large amount of α-Fe phase is caused, resulting in that a sufficient coercive force cannot be obtained. The z value is more preferably 7.2 to 8.0, and is still more preferably 7.3 to 7.8.

Iron (Fe) is an element mainly responsible for the magnetization of the permanent magnet. When a large amount of Fe is contained, it is possible to increase a saturation magnetization of the permanent magnet. However, when an excessively large amount of Fe is contained, the α-Fe phase precipitates and it is difficult to obtain a later-described desired two-phase separation structure, resulting in that the coercive force is lowered. A ratio of Fe to a total amount of the elements (Fe, M, Cu, Co) other than the element R falls within a range of 30 to 40 atomic %. Specifically, the content p of Fe (atomic ratio) falls within a range of 0.3 to 0.4. The content p of Fe is more preferably 0.3 to 0.37, and is still more preferably 0.31 to 0.35.

As the element M, at least one element selected from titanium (Ti), zirconium (Zr), and hafnium (Hf) is used. When the element M is contained, a good coercive force is exhibited in a composition having a high Fe concentration. A ratio of the element M to the total amount of the elements (Fe, M, Cu, Co) other than the element R falls within a range of 1 to 5 atomic %. Specifically, the content q of the element M (atomic ratio) falls within a range of 0.01 to 0.05. By setting the content q of the element M to 0.01 or more, it is possible to increase the Fe concentration, and further, a permanent magnet having such a composition exhibits a good coercive force. If the content q of the element M exceeds 0.05, a hetero-phase rich in the element M is easily generated, and both magnetization and coercive force decrease. The content q of the element M is more preferably 0.01 to 0.03, and is still more preferably 0.015 to 0.025.

Although the element M may be any one of Ti, Zr, and Hf, it preferably contains at least Zr. Particularly, when 50 atomic % or more of the element M is set to Zr, it is possible to further improve the effect of increasing the coercive force of the permanent magnet. Hf in the element M is particularly expensive, so that even when Hf is used, the amount of Hf used is preferably small. The content of Hf is preferably set to less than 20 atomic % of the element M.

Copper (Cu) is an element for enabling the permanent magnet to exhibit a high coercive force. A ratio of Cu to the total amount of the elements (Fe, M, Cu, Co) other than the element R falls within a range of 1 to 10 atomic %. Specifically, the content r of Cu (atomic ratio) falls within a range of 0.01 to 0.1. If the content r of Cu is less than 0.01, it becomes difficult to obtain a high coercive force. If the content r of Cu exceeds 0.1, the magnetization decreases significantly. The content r of Cu is more preferably 0.02 to 0.08, and is still more preferably 0.04 to 0.06.

Cobalt (Co) is an element responsible for the magnetization of the permanent magnet, and necessary for enabling exhibition of high coercive force. Moreover, when a large amount of Co is contained, the Curie temperature becomes high, and thermal stability of the permanent magnet improves. If the content of Co is too small, these effects cannot be obtained sufficiently. However, if the content of Co is too large, the content ratio of Fe decreases relatively, and the magnetization decreases. Therefore, the content of Co is set so that the content p of Fe satisfies the above-described range in consideration of the contents of the element R, the element M and Cu.

A part of Co may be replaced with at least one element A selected from nickel (Ni), vanadium (V), chromium (Cr), manganese (Mn), aluminum (Al), silicon (Si), gallium (Ga), niobium (Nb), tantalum (Ta) and tungsten (W). These replacement elements A contribute to improvement of magnetic properties, for example coercive force. However, excessive replacement of Co with the element A may cause decrease in magnetization, and thus the amount of replacement with the element A is preferably 20 atomic % or less of Co.

The permanent magnet of the embodiment is preferably a sintered magnet formed of a sintered compact having a composition represented by the composition formula (1). In the sintered magnet (sintered compact), a region including a $Th_2Zn_{17}$ crystal phase is set to a main phase. When a cross section or the like of the sintered compact is observed with a scanning electron microscope (SEM), the main phase of the sintered magnet is a phase having a largest area ratio in an observation image (SEM image). The main phase of the sintered magnet preferably has a phase separation structure formed by performing aging treatment on a precursor, which is a $TbCu_7$ crystal phase (1-7 phase/high temperature phase) formed by solution heat treatment.

The structure which forms the permanent magnet of the embodiment includes a cell phase having a $Th_2Zn_{17}$ crystal phase (2-17 phase), and a cell wall phase having a $CaCu_5$ crystal phase (1-5 phase) or the like. The cell wall phase exists to surround the cell phase formed of the 2-17 phase. A magnetic wall energy of the cell wall phase (1-5 phase) formed so as to divide the cell phase (2-17 phase) is larger than a magnetic wall energy of the cell phase (2-17 phase), and this difference in magnetic wall energy becomes a barrier to magnetic wall movement. Namely, it is conceivable that the cell wall phase (1-5 phase) operates as a pinning site of magnetic wall, resulting in that a coercive force of magnetic wall pinning type is exhibited. Typically, the 1-5 phase can be cited as a constituent phase of the cell wall phase, but, the constituent phase is not limited to the 1-5 phase. As will be described later, the cell wall phase is only required to have a Cu-rich composition, when compared to the cell phase.

From a point of view as above, it is thought to be effective to increase the difference in the magnetic wall energy between the cell phase and the cell wall phase, in order to improve the coercive force of the Sm—Co based magnet. In order to increase the difference in the magnetic wall energy, it is effective to generate a difference in Cu concentration between the cell phase and the cell wall phase. Also in a conventional Sm—Co based magnet, a Cu concentration in a cell wall phase is increased up to about 20 atomic %. However, a Sm—Co based magnet having a composition with high Fe concentration such that the content p of Fe in the composition formula (1) is 0.3 or more, does not always obtain a sufficient coercive force. Besides, in the Sm—Co based magnet having the composition with high Fe concentration, a squareness (squareness ratio) of hysteresis loop also tends to deteriorate.

Accordingly, in the permanent magnet of the embodiment, an average magnetization of the cell wall phase is set to 0.2 T (tesla) or less. The average magnetization of the cell wall phase as above can be realized by forming a region with weak magnetism in the cell wall phase, for example. With the use of the cell wall phase whose average magnetization is 0.2 T or less, it is possible to enhance a function of the cell wall phase as the magnetic wall pinning site. Therefore, it becomes possible to improve the coercive force of the Sm—Co based magnet having the composition in which the content p of Fe is 0.3 or more. Furthermore, the squareness ratio of the Sm—Co based magnet can also be improved. Specifically, if there exists a region with weak magnetism in the cell wall phase, an exchange coupling between adjacent cell phases is broken. Therefore, a single magnetic domain structure of the cell phase (2-17 phase) is maintained, resulting in that the squareness ratio of the Sm—Co based magnet is improved. Such a magnetic domain structure also contributes to the improvement of the coercive force.

In order to enhance the function of the cell wall phase as the magnetic wall pinning site and to provide, to the cell wall phase, the function of breaking the exchange coupling between the adjacent cell phases, there is a need to set the average magnetization of the cell wall phase to 0.2 T or less. If the average magnetization of the cell wall phase exceeds 0.2 T, it is possible to obtain only a function similar to that of the cell wall phase in the conventional Sm—Co based magnet, and thus it is not possible to increase the coercive force and the squareness ratio of the Sm—Co based magnet having the composition with high Fe concentration. The average magnetization of the cell wall phase is preferably 0.15 T or less, and is more preferably 0.12 T or less. The average magnetization of the cell wall phase is measured in the following manner.

A technique of evaluating a magnetism of a micro-region in several nm order has been remarkably developed in recent years. As a magnetism evaluation technique of a micro-region, there can be cited, for example, a spin-polarized scanning electron microscopy (spin SEM), a spin-polarized scanning tunneling microscopy (spin STM), a soft X-ray magnetic circular dichroism (XMCD) or the like. By using such a magnetism evaluation technique, it is possible to measure a magnetization of a cell wall phase whose width is about several nm to 10 nm, for example.

The spin SEM is a scanning electron microscope which resolves a spin of secondary electron emitted when an electron beam is irradiated to a magnetic material into three components in X, Y, and Z directions for the detection. The spin SEM can detect spin information under a state where the spin is resolved also in a depth direction of the sample, and has a high resolution also in the depth direction of about 1 nm. The spin STM is an apparatus which controls, while performing scanning on a sample surface with a probe coated with a magnetic thin film, a tunnel current which depends on a spin flowing between the probe and the sample, and detects the tunnel current. The tunnel current flows between one atom at a foremost portion of the probe and the surface, and is quite sensitive to a distance between the probe and the sample, so that the sample surface can be observed with an atomic-level resolution (up to 0.1 nm). Further, a research for clarifying a magnetism of a micro-region by utilizing a magnetic circular dichroism of soft X-ray resonance absorption with a detection depth of several nm, has also been extensively conducted.

By applying the above-described magnetism evaluation technique, it is possible to evaluate a magnetic moment of a micro-region of about 1 nm in the cell wall phase. The measurement of magnetization of the cell wall phase is conducted, with respect to one cell wall phase, at different 5 to 10 positions on the cell wall phase. By averaging measured results at the 5 to 10 positions, an average value of the magnetization of the cell wall phase is determined. The measurement of magnetization of the cell wall phase as above is conducted at arbitrary 20 points on the same sample, and an average value of measurement values except the maximum value and the minimum value of the measurement values at the respective points is determined, and this average value is set as an average magnetization of the cell wall phase. The measurement of magnetization of the cell wall phase is performed with respect to the inside of the sintered compact. Concretely, the measurement is conducted as follows.

In a center portion of a longest side on a surface having a largest area, the measurement is performed in a surface portion and an inside portion of a cross section taken perpendicular to the side (or perpendicular to a tangential line of the center portion when it is a curved line). As positions of measurement, there are provided a reference line 1 drawn perpendicular to a side and inward to an end portion from a position of ½ of each side on the above-described cross section as a start point, and a reference line 2 drawn inward to an end portion from a center of each corner as a start point at a position of ½ of the internal angle of the corner, and the position of 1% of the length of the reference line from the start point of each of these reference lines 1 and 2 is defined as a surface portion and the position of 40% thereof is defined as an inside portion. When the corner has a curvature by chamfering or the like, the intersecting point of extended adjacent sides is taken as an end portion (center of the corner) of the side. In this case, the measurement position is a position not from the intersecting point but from a portion in contact with the reference line. By setting the measurement positions as above, when the cross section is a quadrangle for example, there are four reference lines 1 and four reference lines 2, eight reference lines in total, and there are eight measurement positions each as the surface portion and the inside portion. An observation surface defined thus in the sintered compact is smoothed by polishing and then observed.

The structure having the cell wall phase whose average magnetization is 0.2 T or less can be obtained by forming the region with weak magnetism in the cell wall phase, as described above. For example, it has been conventionally known that the 1-5 phase forming the cell wall phase has a magnetism by itself. The magnetization of the cell wall phase formed of the 1-5 phase as above is lowered by increasing the Cu concentration, and it disappears almost at all by increasing the Cu concentration up to about 50 atomic %. As will be described later in detail, for example, by performing rapid cooling after solution heat treatment and performing isothermal treatment during aging treatment at a low temperature for a long period of time, and by decreasing a cooling rate after the isothermal treatment, it is possible to form a region, in the cell wall phase, in which the Cu concentration is 40 atomic % or more. This makes it possible to realize the cell wall phase whose average magnetization is 0.2 T or less.

The region in which the Cu concentration is 40 atomic % or more is formed in the vicinity of a center of Cu of the cell wall phase, for example, by making a mutual diffusion of Cu sufficiently progress between the cell phase and the cell wall phase. The Cu concentration distribution in the cell wall phase can be measured by using, for example, a 3 dimensional atom probe (3DAP). The measurement of the concentrations of the elements in the cell wall phase by the 3DAP is carried out according to the following procedure. A sample is thinned by dicing, and from the thinned sample, a needle-shaped sample for pickup atom probe (AP) is prepared by focused ion beam (FIB). An atom map is created based on an inter-plane interval (about 0.4 nm) of atomic planes (0003) of the 2-17 phase.

Regarding atom probe data thus created, a profile of only Cu is created, and a place where Cu is thickened is specified. This part rich with Cu is the cell wall phase. The concentration profile of Cu is analyzed in a direction perpendicular to the cell wall phase. An analysis range of the concentration profile is preferably set to 10×10×10 nm or 5×5×10 nm. An example of the concentration profiles of the respective elements is illustrated in FIG. 1. FIG. 1 illustrates concentration profiles of a sintered magnet of an example 1 to be described later. The Cu concentration in the cell wall phase is specified from such concentration profiles. From the Cu profile, a highest value of the Cu concentration is determined. Based on the maximum concentration of Cu, it is determined whether or not the region in which the Cu concentration is 40 atomic % or more exists in the cell wall phase. The measurement through the 3DAP is preferably conducted with respect to the inside of the sintered compact, in a similar manner to that of the above-described measurement of magnetization.

The permanent magnet of this embodiment is produced as follows, for instance. First, an alloy powder containing a predetermined amount of elements is produced. The alloy powder is prepared by grinding an alloy ingot obtained through casting of molten metal melted by an arc melting method or a high-frequency melting method, or by producing an alloy thin strip in a flake form by a strip cast method and thereafter grinding the alloy thin strip. Other examples of the method of preparing the alloy powder are a mechanical alloying method, a mechanical grinding method, a gas atomization method, a reduction diffusion method, and the like. An average grain diameter of the alloy powder preferably falls within a range of 2 to 5 μm, and further, a volume ratio of grains whose grain diameter is in a range of 2 to 10 µm is preferably 80% or more. The alloy powder thus obtained or the alloy before being ground may be heat-treated for homogenization when necessary. A jet mill, a ball mill or the like is used for the grinding. The grinding is preferably performed in an inert gas atmosphere or an organic solvent in order to prevent oxidization of the alloy powder.

Next, the alloy powder is filled in a mold installed in an electromagnet or the like, and is press-formed while a magnetic field is applied thereto. Consequently, a compression-molded body whose crystal axes are oriented is produced. By sintering the compression-molded body under appropriate conditions, it is possible to obtain a sintered compact having a high density. The sintering step of the compression-molded body is conducted in the inert gas atmosphere or the vacuum atmosphere. The sintering step may also be conducted by combining firing in the vacuum atmosphere and firing in the inert gas atmosphere. A sintering temperature is preferably in a range of 1110 to 1200° C. A retention time at the sintering temperature (sintering time) preferably falls within a range of 2 to 20 hours. If the sintering temperature is less than 1110° C., a density of the sintered compact becomes insufficient, and if the sintering temperature exceeds 1200° C., the rare-earth element such as Sm evaporates, resulting in that a composition deviation easily occurs. The sintering temperature is more preferably 1150° C. or more, and is still more preferably 1160° C. or more. The sintering temperature is more preferably 1190° C. or less.

Solution heat treatment and aging treatment are performed on the obtained sintered compact to control the crystal structure. The solution heat treatment step may be performed sequentially from the sintering step. The solution heat treatment step is preferably conducted by performing retention for 6 to 28 hours at a temperature in a range of 1100 to 1180° C., so as to stably obtain the 1-7 phase as the precursor of the phase separation structure. At a temperature lower than 1100° C. and a temperature higher than 1180° C., the ratio of the 1-7 phase in the sample after the solution heat treatment becomes small, resulting in that good magnetic properties cannot be obtained. The solution heat treatment temperature is more preferably in a range of 1120 to 1170° C., and is still more preferably in a range of 1130° C. to 1170° C. The solution heat treatment is preferably performed in a vacuum or an inert atmosphere of Ar gas or the like in order to prevent oxidization.

In the solution heat treatment step, it is preferable to conduct rapid cooling after performing the retention at the above-described temperature for a certain period of time. This rapid cooling is conducted for maintaining the 1-7 phase, which is a metastable phase, also at room temperature. If the sintering and the solution heat treatment are conducted for a long period of time, it is sometimes difficult for the 1-7 phase to stabilize. At this time, when a cooling rate is defined by a rate at which the solution heat treatment temperature is lowered by 200° C., by setting the cooling rate after the solution heat treatment to −170° C./min or higher, the 1-7 phase stabilizes easily, and the coercive force can be exhibited easily. The cooling rate is more preferably −240° C./min or higher, and is still more preferably −500° C./min or higher.

If the cooling rate after the solution heat treatment is less than −170° C./min, a $Ce_2Ni_7$ crystal phase (2-7 phase) is sometimes generated during the cooling. The 2-7 phase may become a factor of decreasing the magnetization and the coercive force, and in addition to that, Cu is often thickened in the 2-7 phase. If Cu is thickened in the 2-7 phase, the Cu concentration in the main phase is lowered, which makes it difficult for phase separation into the cell phase and the cell wall phase by the aging treatment to occur. Further, when the Cu concentration in the main phase is lowered, it is not possible to sufficiently increase the maximum concentration of Cu in the cell wall phase even if the mutual diffusion of Cu occurs between the cell phase and the cell wall phase. In this case, there is a possibility that the magnetization of the cell wall phase cannot be sufficiently weakened.

Next, the aging treatment is performed on the sintered compact after the solution heat treatment. The aging treatment is performed for controlling the crystal structure to increase the coercive force and the squareness ratio of the magnet. The aging treatment is performed such that the sintered compact is retained at a predetermined temperature for a certain period of time, and then is slowly cooled. At this time, by conducting isothermal treatment during the aging treatment at a low temperature for a long period of time and by reducing a cooling rate in the slow cooling treatment after the isothermal treatment, it becomes easy to obtain a structure having a cell wall phase whose average magnetization is 0.2 T or less. The isothermal treatment in the aging treatment is preferably conducted by performing the retention for 55 to 120 hours at a temperature of 700 to 850° C. It is preferable that in the slow cooling treatment after the isothermal treatment, the slow cooling is performed at a cooling rate within a range of −0.2 to −1° C./min until a temperature reaches 400 to 650° C., and the cooling is successively performed until the temperature reaches room temperature.

If the isothermal treatment temperature during the aging treatment exceeds 850° C., a homogeneous mixed structure of the cell phase and the cell wall phase cannot be obtained, and it is not possible to make the thickening of Cu in the cell wall phase sufficiently progress. The same applies to a case where the isothermal treatment time is less than 55 hours, and a sufficient thickening of Cu in the cell wall phase cannot be realized. For this reason, it is not possible to sufficiently weaken the magnetization of the cell wall phase. If the isothermal treatment time exceeds 120 hours, a thickness of the cell wall phase is increased, resulting in that a volume fraction of the cell phase is decreased, and the magnetic properties deteriorate. In the isothermal treatment in the aging treatment, it is more preferable to perform the retention at a temperature of 700 to 800° C. for 60 to 120 hours. The isothermal treatment time is more preferably 80 hours or more. Also in a case where the cooling rate in the slow cooling treatment in the aging treatment exceeds −1° C./min, it is not possible to make the thickening of Cu in the cell wall phase sufficiently progress. The cooling rate is more preferably within a range of −0.2 to −0.5° C./min.

The aging treatment may also be performed by heat treatment of two stages. Specifically, the above-described isothermal treatment is set to heat treatment of the first stage, and by performing the slow cooling to the temperature of 400 to 650° C., and then successively performing the retention at the temperature of 400 to 650° C. for a certain period of time, heat treatment of the second stage is conducted. After the heat treatment of the second stage, the cooling is performed to room temperature by furnace cooling. The coercive force is further improved by conducting the heat treatment of the two stages as above. The retention time at the heat treatment temperature of the second stage is preferably set to 1 to 6 hours. The aging treatment is not limited to the heat treatment of the two stages, and may be heat treatment of more stages, or it is further effective to perform cooling of multiple stages. Further, as pre-treatment before the aging treatment, it is also effective to perform preliminary aging treatment at a lower temperature and for a shorter period of time than in the aging treatment. For preventing oxidation, the aging treatment is preferably performed in a vacuum or an inert gas atmosphere of Ar gas or the like.

The permanent magnet of this embodiment can be used for various motors and power generators. Further, it is possible to use the permanent magnet as a stationary magnet or a variable magnet of a variable magnetic flux motor or a variable magnetic flux power generator. Various motors and power generators are formed by using the permanent magnet of this embodiment. When the permanent magnet of this embodiment is applied to a variable magnetic flux motor, the known techniques can be applied to a configuration and a drive system of the variable magnetic flux motor.

Figure 2:
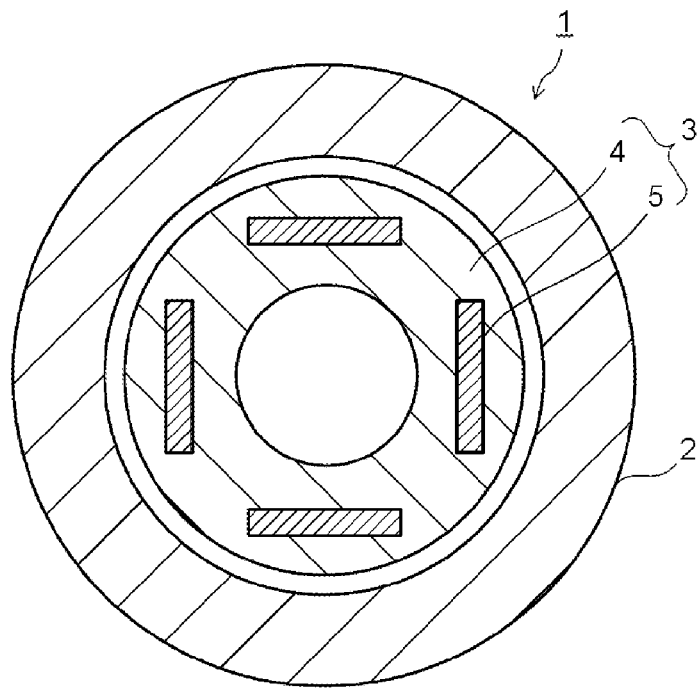
FIG. 2 is a diagram illustrating a permanent magnet motor of an embodiment.

Next, a motor and a power generator of embodiments will be described with reference to the drawings. FIG. 2 illustrates a permanent magnet motor according to the embodiment. In a permanent magnet motor 1 illustrated in FIG. 2, a rotor 3 is disposed in a stator 2. In an iron core 4 of the rotor 3, permanent magnets 5 of the embodiment are disposed. Based on properties and the like of the permanent magnets of the embodiment, high efficiency, miniaturization, cost reduction and the like of the permanent magnet motor 1 can be achieved.

Figure 3:
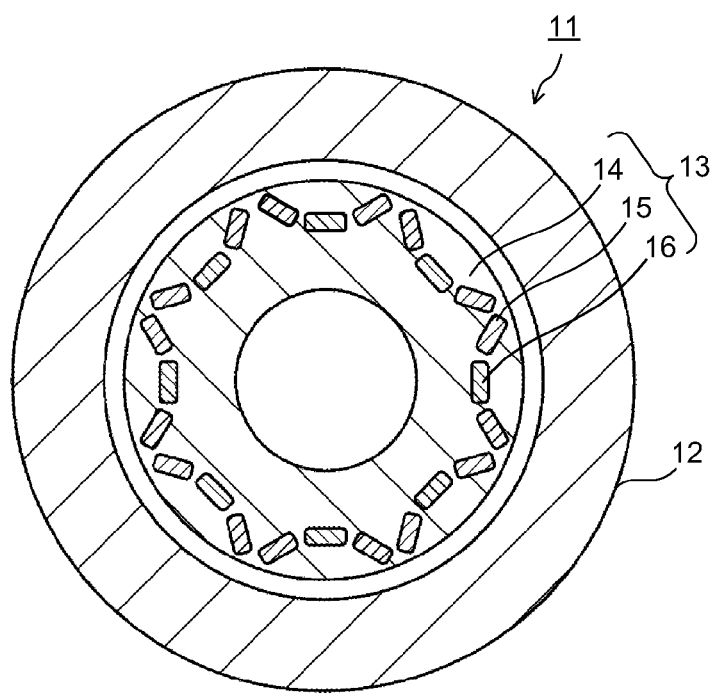
FIG. 3 is a diagram illustrating a variable magnetic flux motor of an embodiment.

FIG. 3 illustrates a variable magnetic flux motor of the embodiment. In a variable magnetic flux motor 11 illustrated in FIG. 3, a rotor 13 is disposed in a stator 12. In an iron core 14 of the rotor 13, the permanent magnet of the embodiment is disposed as stationary magnets 15 and variable magnets 16. A magnetic flux density (magnetic flux amount) of the variable magnets 16 is variable. A magnetization direction of the variable magnets 16 is orthogonal to a Q-axis direction, and thus is not affected by a Q-axis current, and can be magnetized by a D-axis current. A magnetization winding (not illustrated) is provided on the rotor 13. It is structured such that by passing a current from a magnetization circuit through this magnetization winding, a magnetic field thereof operates directly on the variable magnets 16.

According to the permanent magnet of the embodiment, it is possible to obtain a suitable coercive force in the stationary magnets 15. When the permanent magnets of the embodiment are applied to the variable magnets 16, it is only required that the coercive force is controlled to fall within a range of, for example, 100 to 500 kA/m by changing the various conditions (aging treatment condition and so on) of the aforementioned manufacturing method. Note that in the variable magnetic flux motor 11 illustrated in FIG. 3, the permanent magnet of the embodiment can be used for both the stationary magnets 15 and the variable magnets 16, but, the permanent magnet of the embodiment may be used for either one of the magnets. The variable magnetic flux motor 11 is capable of outputting a large torque from a small device size, and thus is preferred for a motor of a hybrid vehicle, electric vehicle, or the like required to have high output power and small size of the motor.

Figure 4:
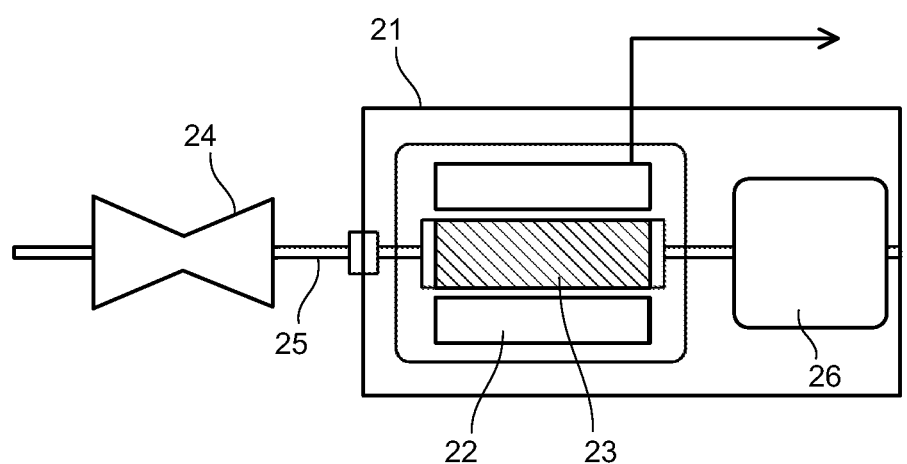
FIG. 4 is a diagram illustrating a power generator of an embodiment.

FIG. 4 illustrates a power generator according to the embodiment. A power generator 21 illustrated in FIG. 4 includes a stator 22 using the permanent magnet of the embodiment. A rotor 23 disposed inside the stator 22 is coupled to a turbine 24 provided on one end of the power generator 21 via a shaft 25. The turbine 24 is rotated by, for example, fluid supplied from the outside. Note that it is also possible to rotate the shaft 25 by, not the turbine 24 rotated by fluid, but a transmission of dynamic rotations of regenerative energy or the like of an automobile. Various publicly known configurations may be employed for the stator 22 and the rotor 23.

The shaft 25 is in contact with a commutator (not illustrated) disposed on the opposite side of the turbine 24 with respect to the rotor 23, and electromotive force generated by rotations of the rotor 23 is increased in voltage to a system voltage and transmitted as output of the power generator 21 via isolated phase buses and a main transformer (not illustrated). The power generator 21 may be either of an ordinary power generator and a variable magnetic flux power generator. Incidentally, static electricity from the turbine 24 or charges by an axial current accompanying power generation occur on the rotor 23. Accordingly, the power generator 21 has a brush 26 for discharging the charges of the rotor 23.

EXAMPLES

Next, examples and evaluation results thereof will be described.

Example 1

After respective raw materials were weighed and mixed at predetermined ratios, the resultants were high-frequency-melted in an Ar gas atmosphere and then subjected to casting, thereby producing an alloy ingot. The alloy ingot was coarsely ground and further pulverized with a jet mill, to thereby prepare an alloy powder. The alloy powder was press-molded in a magnetic field to produce a compression-molded body. The compression-molded body of the alloy powder was placed in a firing furnace, and sintering was performed in a manner that a temperature was increased to 1190° C. in the Ar atmosphere, and retention was performed at that temperature for 3 hours. Consecutively, solution heat treatment was conducted by performing retention at 1140° C. for 10 hours, and after that, rapid cooling was conducted to 990° C. at a cooling rate of −250° C./min, and cooling was further performed to room temperature.

Subsequently, a temperature of the sintered compact after the solution heat treatment was increased to 800° C., and the sintered compact was retained at that temperature for 60 hours, to thereby perform aging treatment. The sintered compact after being subjected to the aging treatment was slowly cooled to 450° C. at a cooling rate of −0.3° C./min, the resultant was retained at that temperature for 3 hours and then furnace-cooled to room temperature, thereby obtaining a target sintered magnet. Compositions of the sintered magnets are as presented in Table 1. A composition analysis for the magnets was performed by an ICP (Inductively Coupled Plasma) method. Conditions of manufacturing the sintered magnets are presented in Table 2.

Note that the composition analysis by the ICP method was performed through the following procedure. First, a sample picked up from the aforesaid measurement points is ground in a mortar, and a predetermined amount of this ground sample is weighed to be put into a quartz beaker. A mixed acid (containing nitric acid and hydrochloric acid) is put into the quartz beaker, which is heated to about 140° C. on a hotplate so that the sample is completely melted. After it is left standing to cool, it is transferred to a PFA volumetric flask and is subjected to an isovolumetric process to be a sample solution. In such a sample solution, contained components are quantitated by a calibration curve method using an ICP emission spectrophotometer. As the ICP emission spectrophotometer, SPS4000 (product name) manufactured by SII Nano Technology was used.

Following the aforesaid method, a Cu concentration distribution in a cell wall phase of each of the obtained sintered magnets was measured. Results thereof are presented in FIG. 1. Further, a coercive force, a residual magnetization (Br), and a maximum energy product ($(BH)_{max}$) of each of the sintered magnets were evaluated by a B—H tracer. Measured results of the coercive force and the residual magnetization are presented in Table 3. Further, from measured results of the residual magnetization (Br) and the maximum energy product ($(BH)_{max}$), a squareness ratio was determined based on the following expression. Results thereof are collectively presented in Table 3.

Squareness ratio=$(BH)_{max}/(Br^2/4)$

As is apparent from FIG. 1, it can be understood that Cu is segregated in the cell wall phase. Further, it was confirmed that an average Cu concentration in the vicinity of a center portion (a region separated from the center portion by about ±0.5 nm) of the cell wall phase reaches 48 atomic %. When the magnetization of that portion was measured by the spin STM, it was 0.15 T. The measurement of magnetization was performed with respect to other four positions in the cell wall phase, and measurement values of five positions in total were averaged. Further, when the measurement of magnetization as above was conducted at arbitrary 20 points, and an average value of measurement values (average values) of those points except the maximum value and the minimum value of the measurement values was determined, the average magnetization of the cell wall phase in the sintered magnet of the example 1 was 0.17 T. The coercive force, the residual magnetization, and the squareness ratio of the sintered magnet of the example 1 were 1450 kA/m, 1.225 T, and 90.7%, respectively.

Examples 2 and 3

Sintered magnets each having a composition presented in Table 1 were produced under the same conditions as those of the example 1. A Cu concentration distribution in a cell wall phase, a coercive force, a residual magnetization, and a squareness ratio of each of the obtained sintered magnets were measured and evaluated in a similar manner to that of the example 1. Measured results thereof are presented in Table 3. Further, from the measured result of the Cu concentration distribution in the cell wall phase, it was confirmed that there exists a region having the Cu concentration exceeding 40 atomic %, in the vicinity of a center portion of the cell wall phase of each of the sintered magnets of the examples 2 and 3, similar to the example 1.

Example 4

After respective raw materials were weighed and mixed at predetermined ratios, the resultants were high-frequency-melted in an Ar gas atmosphere and then subjected to casting, thereby producing an alloy ingot. The alloy ingot was coarsely ground and further pulverized with a jet mill, to thereby prepare an alloy powder. The alloy powder was press-molded in a magnetic field to produce a compression-molded body. The compression-molded body of the alloy powder was placed in a firing furnace, and sintering was performed in a manner that a temperature was increased to 1180° C. in the Ar atmosphere, and retention was performed at that temperature for 5 hours. Consequently, solution heat treatment was conducted by performing retention at 1130° C. for 12 hours, and after that, rapid cooling was conducted to 980° C. at a cooling rate of −300° C./min, and cooling was further performed to room temperature.

Subsequently, a temperature of the sintered compact after the solution heat treatment was increased to 790° C., and the sintered compact was retained at that temperature for 80 hours, to thereby perform aging treatment. The sintered compact after being subjected to the aging treatment was slowly cooled to 480° C. at a cooling rate of −0.2° C./min, the resultant was retained at that temperature for 2 hours and then furnace-cooled to room temperature, thereby obtaining a target sintered magnet. A composition, a Cu concentration distribution in a cell wall phase, a coercive force, a residual magnetization, and a squareness ratio of each of the obtained sintered magnets were measured and evaluated in a similar manner to that of the example 1. Measured results thereof are presented in Table 3. Further, from the measured result of the Cu concentration distribution in the cell wall phase, it was confirmed that there exists a region having the Cu concentration exceeding 40 atomic %, in the vicinity of a center portion of the cell wall phase of the sintered magnet of the example 4, similar to the example 1.

Examples 5 and 6

Sintered magnets each having a composition presented in Table 1 were produced under the same conditions as those of the example 4. A composition, a Cu concentration distribution in a cell wall phase, a coercive force, a residual magnetization, and a squareness ratio of each of the obtained sintered magnets were measured and evaluated in a similar manner to that of the example 1. Measured results thereof are presented in Table 3. Further, from the measured result of the Cu concentration distribution in the cell wall phase, it was confirmed that there exists a region having the Cu concentration exceeding 40 atomic %, in the vicinity of a center portion of the cell wall phase of each of the sintered magnets of the examples 5 and 6, similar to the example 1.

Comparative Examples 1 to 3

By using a mixture of raw materials formed by weighing and mixing respective raw materials at predetermined ratios to achieve the composition presented in Table 1, an alloy powder was prepared in a similar manner to that of the example 1. The alloy powder was press-molded in a magnetic field to produce a compression-molded body, and thereafter, the compression-molded body was subjected to a sintering step, a solution heat treatment step, and an aging treatment step under conditions presented in Table 2, to thereby produce a sintered magnet. A composition, a Cu concentration distribution in a cell wall phase, a coercive force, a residual magnetization, and a squareness ratio of each of the obtained sintered magnets were measured and evaluated in a similar manner to that of the example 1. Measured results thereof are presented in Table 3. From the measured result of the Cu concentration distribution in the cell wall phase, it was confirmed that the maximum Cu concentration in the cell wall phase of each of the sintered magnets of the comparative examples 1 to 3 does not reach 40 atomic %.

TABLE 1

| | Magnet composition (atomic ratio) |
|---|---|
| Example 1 | $Sm(Fe_{0.325}Zr_{0.019}Cu_{0.057}Co_{bal.})_{7.7}$ |
| Example 2 | $Sm(Fe_{0.333}Zr_{0.018}Cu_{0.056}Co_{bal.})_{7.8}$ |

TABLE 1-continued

| | Magnet composition (atomic ratio) |
|---|---|
| Example 3 | $Sm(Fe_{0.317}Zr_{0.012}Ti_{0.005}Cu_{0.058}Co_{bal.})_{7.5}$ |
| Example 4 | $Sm(Fe_{0.308}Zr_{0.019}Hf_{0.003}Cu_{0.056}Co_{bal.})_{7.6}$ |
| Example 5 | $(Sm_{0.96}Nd_{0.04})(Fe_{0.312}Zr_{0.018}Cu_{0.055}Co_{bal.})_{7.7}$ |
| Example 6 | $(Sm_{0.95}Ce_{0.05})(Fe_{0.312}Zr_{0.018}Cu_{0.055}Al_{0.002}Co_{bal.})_{7.7}$ |
| Comparative Example 1 | $Sm(Fe_{0.325}Zr_{0.019}Cu_{0.057}Co_{bal.})_{7.7}$ |
| Comparative Example 2 | $Sm(Fe_{0.325}Zr_{0.019}Cu_{0.057}Co_{bal.})_{7.7}$ |
| Comparative Example 3 | $Sm(Fe_{0.325}Zr_{0.019}Cu_{0.057}Co_{bal.})_{7.7}$ |

TABLE 2

| | Example 1 to 3 | Example 4 to 6 | Comparative Example 1 | Comparative Example 2 | Comparative Example 3 |
|---|---|---|---|---|---|
| Sintering Temperature [° C.] | 1190 | 1180 | 1190 | 1200 | 1180 |
| Sintering Time [h] | 3 | 5 | 4 | 3 | 4 |
| Solution Heat Treatment Temperature [° C.] | 1140 | 1130 | 1145 | 1140 | 1135 |
| Solution Heat Treatment Time [h] | 10 | 12 | 8 | 10 | 12 |
| Cooling Rate After Solution Heat Treatment [° C./min] | −250 | −300 | −140 | −100 | −150 |
| Aging Treatment Temperature [° C.] | 800 | 790 | 800 | 810 | 790 |
| Aging Treatment Time [h] | 60 | 80 | 60 | 30 | 80 |
| Cooling Rate After Aging Treatment [° C./min] | −0.3 | −0.2 | −0.3 | −0.3 | −1.2 |

TABLE 3

| | Average Magnetization of Cell Wall Phase [T] | Coercive Force [kA/m] | Residual Magnetization [T] | Squareness Ratio [%] |
|---|---|---|---|---|
| Example 1 | 0.17 | 1450 | 1.225 | 90.7 |
| Example 2 | 0.12 | 1380 | 1.217 | 92.1 |
| Example 3 | 0.15 | 1650 | 1.212 | 91.5 |
| Example 4 | 0.09 | 1700 | 1.208 | 92.5 |
| Example 5 | 0.14 | 1330 | 1.228 | 90.1 |
| Example 6 | 0.17 | 1350 | 1.221 | 91.3 |
| Comparative Example 1 | 0.24 | 1410 | 1.223 | 84.8 |
| Comparative Example 2 | 0.55 | 1330 | 1.229 | 82.9 |
| Comparative Example 3 | 0.43 | 1510 | 1.217 | 83.7 |

As is apparent from Table 3, it can be understood that in each of the sintered magnets of the examples 1 to 6, the magnetization of the cell wall phase is weakened, resulting in that a high coercive force and a high squareness ratio are provided to each of the magnets. It can be understood that the magnetization is large in each of the sintered magnets of the examples 1 to 6, based on the high Fe concentration. It can be understood that each of the sintered magnets of the comparative examples 1 to 3 has a low squareness ratio and a low coercive force, due to a large magnetization of the cell wall phase.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the methods described herein may be made without departing from the spirit of the inventions. The accompanying claims and their equivalents are intended to cover such forms or modifications as would fall within the scope and spirit of the inventions.

What is claimed is:

1. A permanent magnet, comprising:
a composition expressed by a composition formula:

$$R(Fe_pM_qCu_rCo_{1-p-q-r})_z,$$

where R is at least one element selected from the group consisting of rare-earth elements, M is at least one element selected from the group consisting of Zr, Ti, and Hf, p is a number, which is an atomic ratio, satisfying $0.3 \leq p \leq 0.4$, q is a number, which is an atomic ratio, satisfying $0.01 \leq q \leq 0.05$, r is a number, which is an atomic ratio, satisfying $0.01 \leq r \leq 0.1$, and z is a number, which is an atomic ratio, satisfying $7 \leq z \leq 8.5$; and
a structure including a cell phase having a $Th_2Zn_{17}$ crystal phase, and a cell wall phase surrounding the cell phase, wherein an average magnetization of the cell wall phase is 0.2 T or less,
the cell wall phase has a region in which a Cu concentration is 40 atomic % or more, and
a coercive force of the permanent magnet is 1330 kA/m or more, and a squareness ratio of the permanent magnet is 90.1% or more.

2. The permanent magnet of claim 1, wherein the cell wall phase has a $CaCu_5$ crystal phase.

3. The permanent magnet of claim 1, wherein 50 atomic % or more of the element R in the composition formula is Sm.

4. The permanent magnet of claim 1, wherein 50 atomic % or more of the element M in the composition formula is Zr.

5. A motor, comprising the permanent magnet of claim 1.

6. A power generator, comprising the permanent magnet of claim 1.

7. The permanent magnet of claim 1, wherein p is a number, which is an atomic ratio, satisfying $0.325 \leq p \leq 0.4$.

8. The permanent magnet of claim 1, wherein q is a number, which is an atomic ratio, satisfying $0.01 \leq q \leq 0.019$.

9. The permanent magnet of claim 1, wherein r is a number, which is an atomic ratio, satisfying $0.01 \leq r \leq 0.058$.

10. The permanent magnet of claim 1, wherein a residual magnetization of the permanent magnet is 1.208 T or more.

11. A permanent magnet, comprising:

a composition expressed by a composition formula:

$R(Fe_p M_q Cu_r (Co_{1-s} A_s)_{1-p-q-r})_z$, where R is at least one element selected from the group consisting of rare-earth elements, M is at least one element selected from the group consisting of Zr, Ti, and Hf, A is at least one element selected from the group consisting of Ni, V, Cr, Mn, Al, Si, Ga, Nb, Ta, and W, p is a number, which is an atomic ratio, satisfying $0.3 \leq p \leq 0.4$, q is a number, which is an atomic ratio, satisfying $0.01 \leq q \leq 0.05$, r is a number, which is an atomic ratio, satisfying $0.01 \leq r \leq 0.1$, s is a number, which is an atomic ratio, satisfying $0 \leq s \leq 0.2$, and z is a number, which is an atomic ratio, satisfying $7 \leq z \leq 8.5$; and a structure including a cell phase having a Th2Zn17 crystal phase, and a cell wall phase surrounding the cell phase, wherein an average magnetization of the cell wall phase is 0.2 T or less, the cell wall phase has a region in which a Cu concentration is 40 atomic % or more, and a coercive force of the permanent magnet is 1330 kA/m or more, and a squareness ratio of the permanent magnet is 90.1% or more.

* * * * *